US005644826A

United States Patent [19]
Reyes

[11] Patent Number: 5,644,826
[45] Date of Patent: Jul. 8, 1997

[54] SPIN CLOSING APPARATUS AND METHOD

[75] Inventor: Antonio Manuel Rodriguez Reyes, Jerez Fra, Spain

[73] Assignee: Delphi Automotives Systems Espana S.A., Cadiz, Spain

[21] Appl. No.: 324,146

[22] Filed: Oct. 17, 1994

[30] Foreign Application Priority Data

Jun. 25, 1994 [GB] United Kingdom ............... 9412806

[51] Int. Cl.⁶ .................................................. B23P 11/00
[52] U.S. Cl. .............................. 29/243.5; 72/100; 72/110
[58] Field of Search ........................ 29/243.5, 243.517, 29/243.518, 511, 513; 72/95, 100, 110, 126

[56] References Cited

U.S. PATENT DOCUMENTS

| | | | |
|---|---|---|---|
| 2,264,060 | 11/1941 | Whyte | 29/511 X |
| 3,889,618 | 6/1975 | Jarvis et al. | 29/243.5 X |
| 4,480,730 | 11/1984 | Koller et al. | 188/315 |
| 4,667,941 | 5/1987 | Hayashi et al. | 267/64.16 |

FOREIGN PATENT DOCUMENTS

| | | | |
|---|---|---|---|
| 27 552 | of 1964 | Germany. | |
| 16 52 641 | 4/1971 | Germany. | |
| 400067 | 10/1933 | United Kingdom | 72/126 |

*Primary Examiner*—Joseph M. Gorski
*Attorney, Agent, or Firm*—Jeffrey A. Sedlar

[57] ABSTRACT

Apparatus for spin closing an open end of a tube of a suspension strut comprising a throughbore having a longitudinal axis; a first pair of rollers, each roller of the first pair being rotatably mounted in a bore opening into the throughbore, having a contact surface at a first predetermined angle to the longitudinal axis and which extends into the throughbore, and being biased such that the contact surface can retract from the throughbore against the action of biasing means; and a second pair of rollers, each roller of the second pair being rotatably mounted in a bore opening into the throughbore, and having a contact surface at a second predetermined angle to the longitudinal axis and which extends into the throughbore; wherein the second predetermined angle is greater than the first predetermined angle; and wherein the first pair of rollers is offset from the second pair of rollers along the longitudinal axis such that, on insertion, the open end of the tube of the suspension strut will make contact with the contact surfaces of the first pair of rollers before contacting the contact surfaces of the second pair of rollers. Allows spin closing of the open end of a suspension strut at a single workstation.

7 Claims, 4 Drawing Sheets

SPIN CLOSING APPARATUS AND METHOD

BACKGROUND OF THE INVENTION

The present invention relates to apparatus for spin closing an open end of a suspension strut, and to a method of spin closing an open end of a suspension strut.

Attention is drawn to related U.S. Patent Application Serial Nos. (Attorney Docket Nos. H-179172, H-185553 and H-185554), all three entitled "Hydraulic Damper", filed concurrently with the present application.

A suspension strut for a motor vehicle typically comprises an outer metallic tube which is closed at one end. A piston slidably positioned inside the tube is attached to a piston rod which extends out of the open end of the tube. A piston rod guide and seal is positioned inside the tube at the open end thereof. After insertion of the above components and any other required components into the tube during assembly of the suspension strut, the open end of the tube is spun closed.

The spin closing operation is carried out at two work stations. At the first work station, the assembled suspension strut is rotated about its longitudinal axis and a section of the tube at the open end is brought into contact with two diametrically opposed rollers having a contact surface at an angle of approximately 45° to the longitudinal axis. This operation pushes over the section of the tube at the open end to an angle of approximately 45° The suspension strut is then moved to a second workstation where, in a similar operation, but using rollers having a contact surface at an angle of approximately 90°, a portion of the section is pushed over at approximately 90° to close the suspension strut at the open end of the tube. These types of operation are commonly referred to as spin forming or spin closing.

SUMMARY OF THE INVENTION

It is an object of the present invention to spin close the open end of the tube at a single workstation.

To this end, apparatus in accordance with the present invention for spin closing an open end of a tube of a suspension strut comprises a throughbore having a longitudinal axis; a first pair of rollers, each roller of the first pair being rotatably mounted in a bore opening into the throughbore, having a contact surface at a first predetermined angle to the longitudinal axis and which extends into the throughbore, and being biased such that the contact surface can retract from the throughbore against the action of biasing means; and a second pair of rollers, each roller of the second pair being rotatably mounted in a bore opening into the throughbore, and having a contact surface at a second predetermined angle to the longitudinal axis and which extends into the throughbore; wherein the second predetermined angle is greater than the first predetermined angle; and wherein the first pair of rollers is offset from the second pair of rollers along the longitudinal axis such that, on insertion, the open end of the tube of the suspension strut will make contact with the contact surfaces of the first pair of rollers before contacting the contact surfaces of the second pair of rollers.

The present invention is applicable for forming suspension struts which comprise an inner tube and an outer tube (sometimes referred to as twin tube dampers) or suspension struts having a single tube (sometimes referred to as monotube dampers).

BRIEF DESCRIPTION OF THE DRAWINGS

The present invention will now be described, by way of example, with reference to the accompanying drawings, in which.

DETAILED DESCRIPTION OF THE PRESENTLY PREFERRED EMBODIMENT

Figure 1:
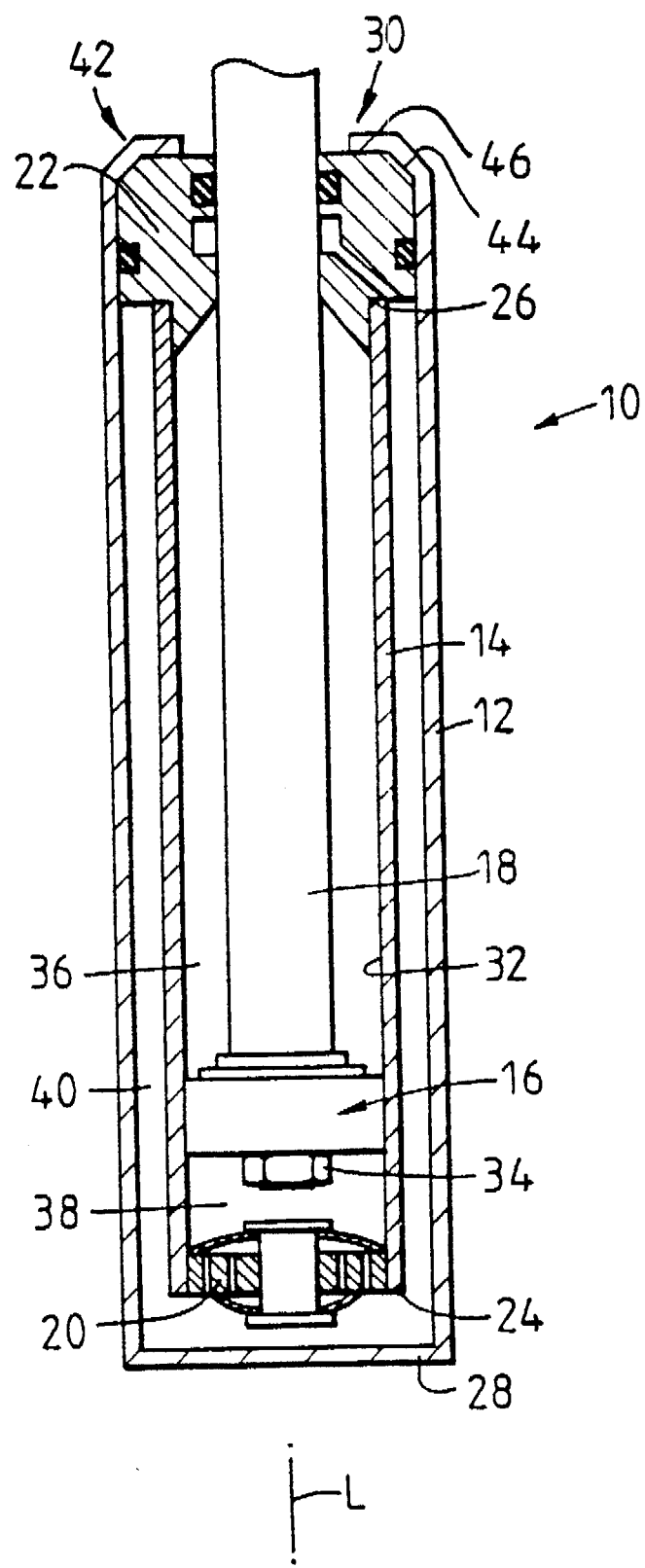
FIG. 1 is a cross-sectional view of a suspension strut formed in accordance with the present invention.

Referring to the drawings, the suspension strut 10 shown in FIG. 1 is of the twin tube damper type, and comprises an outer tube 12, an inner tube 14 substantially coaxial with the outer tube on an axis L, a piston assembly 16, a piston rod 18 having a longitudinal axis on axis L, a compensation valve 20, and a rod guide 22. The piston assembly 16, the compensation valve 20 and the rod guide 22 may be any suitable conventional design well known to those skilled in the art, and will not be described in detail. The inner tube 14 is substantially closed at one end 24 by the compensation valve 20, and is substantially closed at the other end 26 by the rod guide 22. The outer tube 12 is closed at one end 28 by an integral formation of the outer tube walls, and is substantially closed at the other end 30 (the open end) by the rod guide 22 and by spin closing the end 30 of the tube as will be described in more detail below. The piston rod 18 extends through, and makes a sealing sliding fit with the rod guide 22. The piston assembly 16 makes a sealing sliding fit with the inner surface 32 of the inner tube 14. The piston rod 18 is secured to the piston assembly 16 by a nut 34 or any other suitable means. The piston assembly 16 divides the inner area of the inner tube 14 into a rebound chamber 36 and a compression chamber 38. The area between the inner tube 14 and the outer tube 12 defines a compensation chamber 40. The rebound and compression chambers 36 and 38 are substantially filled with fluid to damp reciprocating movement of the piston assembly 16 and piston rod 18 along axis L relative to the outer and inner tubes 12 and 14. The compensating chamber 40 is partly filled with fluid and acts as a reservoir for the fluid in the rebound and compression chambers 36 and 38. The suspension strut 10 is mounted in a motor vehicle (not shown) in the standard manner.

Figure 2:
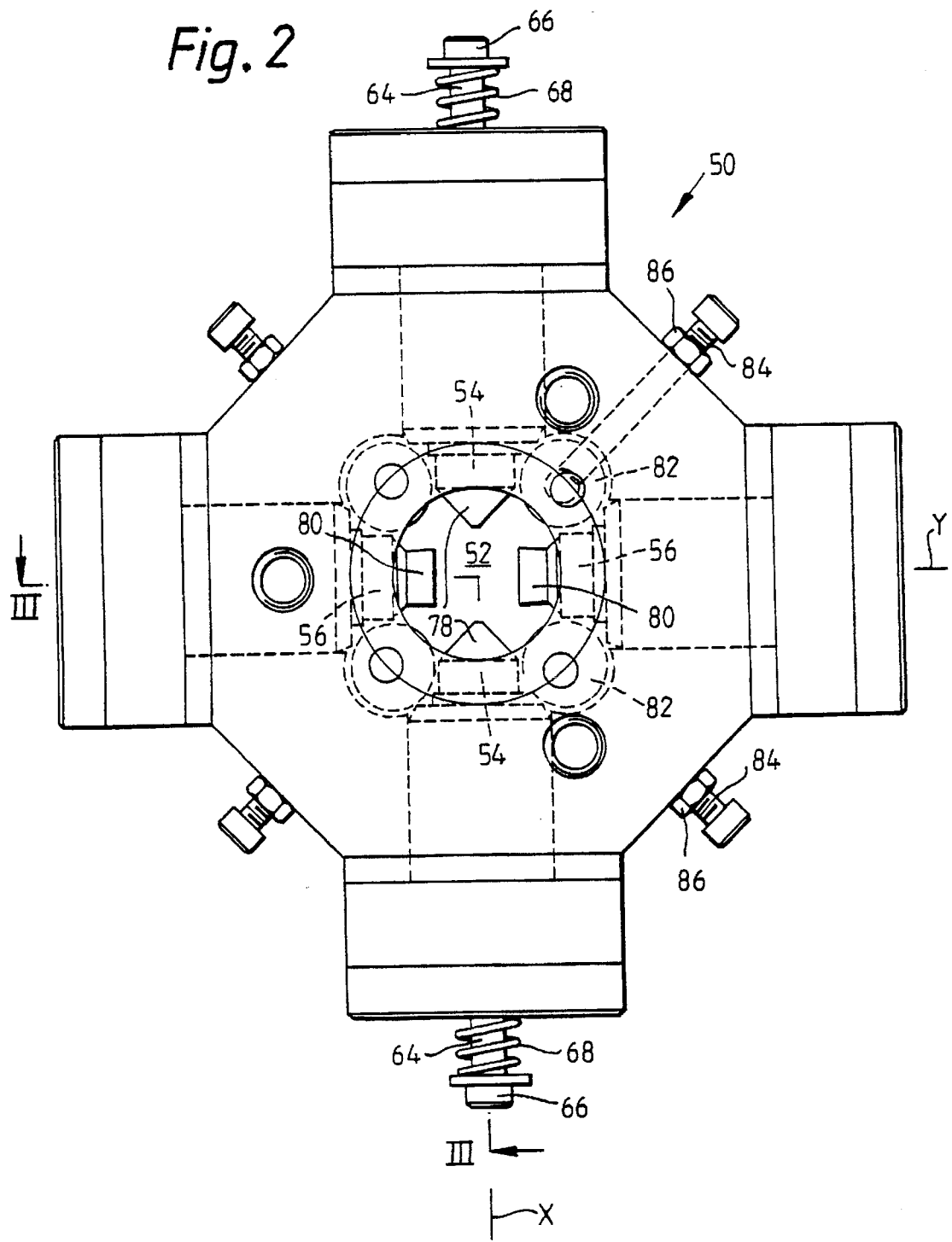
FIG. 2 is a top view of apparatus in accordance with the present invention.
Figure 3:
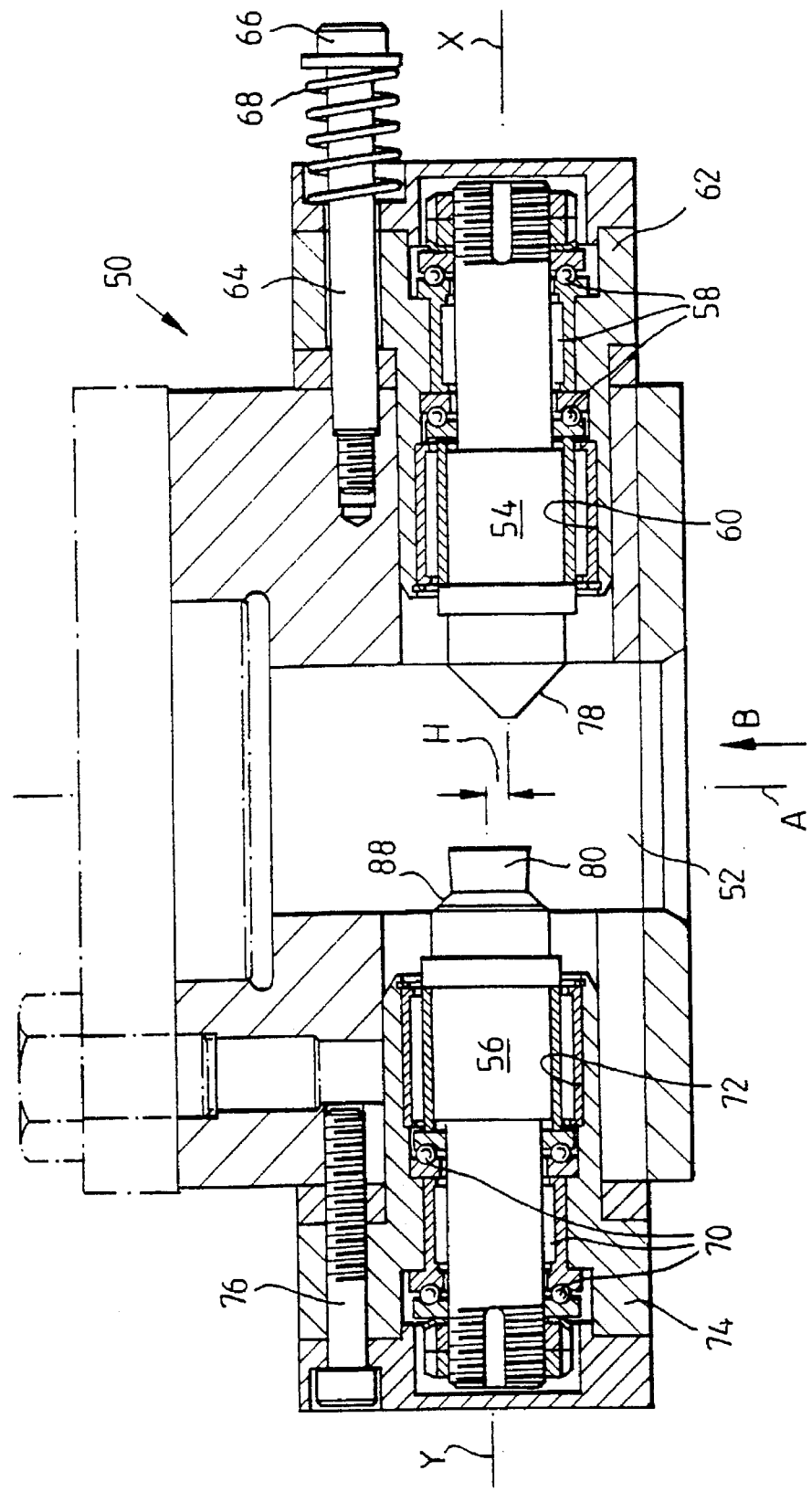
FIG. 3 is a cross-sectional view on the line III—III of FIG. 2.

The end 30 of the outer tube 12 comprises a section 42 of the outer tube which is directed inwardly towards the axis L. The section 42 comprises a first portion 44 which is directed inwardly at an angle of approximately 45° to the axis L, and a second portion 46 at the extremity of the outer tube 12 which is directed inwardly at an angle of approximately 90° to the axis L. Prior to spin closing the section 42, the suspension strut 10 is assembled by closing the end 28 of the outer tube 12, inserting the inner tube 14 with the compensation valve 24 in position, the piston assembly 16 and piston rod 18, and the rod guide 22. The section 42 is then formed using apparatus 50 as shown in FIGS. 2 and 3.

The apparatus 50 comprises a throughbore 52 which has a longitudinal axis A which aligns with the axis L of the suspension strut 10 during formation of the section 42. Projecting into the throughbore 52 are two pairs of rollers 54,56. The rollers 54 of the first pair of rollers are positioned substantially diametrically opposed one another relative to the throughbore 52 with aligned longitudinal axes X. The rollers 56 of the second pair of rollers are positioned substantially diametrically opposed one another relative to the throughbore 52 with aligned longitudinal axes Y which are at substantially 90° to the axes X. Both sets of axes X,Y are at substantially 90° to the axis A. As can be seen from FIG. 3, the axes X of the first pair of rollers 54 are offset from the axes Y of the second pair of rollers 56 by an amount H along axis A.

Each roller 54 of the first pair of rollers, which rotates about its axis X, is rotatably mounted on bearings 58 positioned in a bore 60 which opens into the throughbore 52. The bore 60 is defined by a housing 62. The housing 62 is retained in position by way of a stud 64 having a head 66. A helical spring 68 positioned between the head 66 and the housing 62 biases the housing, and hence the roller 54, towards the throughbore 52. With this arrangement, each roller 54 can reciprocate along its axis X relative to the throughbore 52. Each roller 56 of the second pair of rollers, which rotates about its axis Y, is rotatably mounted on bearings 70 positioned in a bore 72 which opens into the throughbore 52. The bore 72 is defined by a housing 74. The housing 74 is fixed in position by way of a stud 76. With this arrangement, the rollers 56 are fixed relative to throughbore 52.

Each roller 54 of the first pair of rollers has a contact surface 78 which is at substantially 45° to the axes X and A. Each roller 56 of the second pair of rollers has a contact surface 80 which is substantially parallel to its axis Y and at substantially 90° to the axis A.

Additional rollers 82 are positioned around, and project into, the throughbore 52. These rollers 82 act on an inserted suspension strut 10 (as explained below) to centralise the suspension strut in the throughbore 52. The position of each roller 82 relative to the throughbore 52 is adjusted and then secured by a threaded stud 84 and nut 86.

Figure 4:
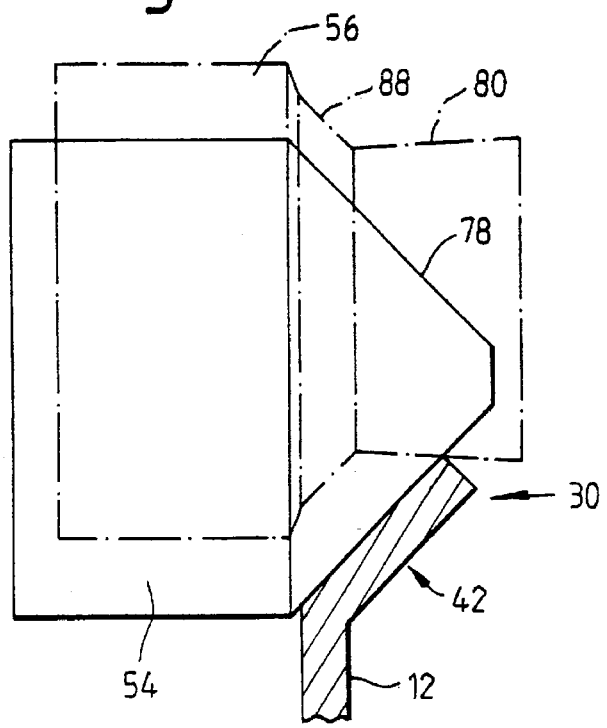
FIGS. 4 and 5 are enlarged side views of the rollers of the apparatus of FIGS. 2 and 3 relative to the tube of the suspension strut during the spin closing operation.
Figure 5:
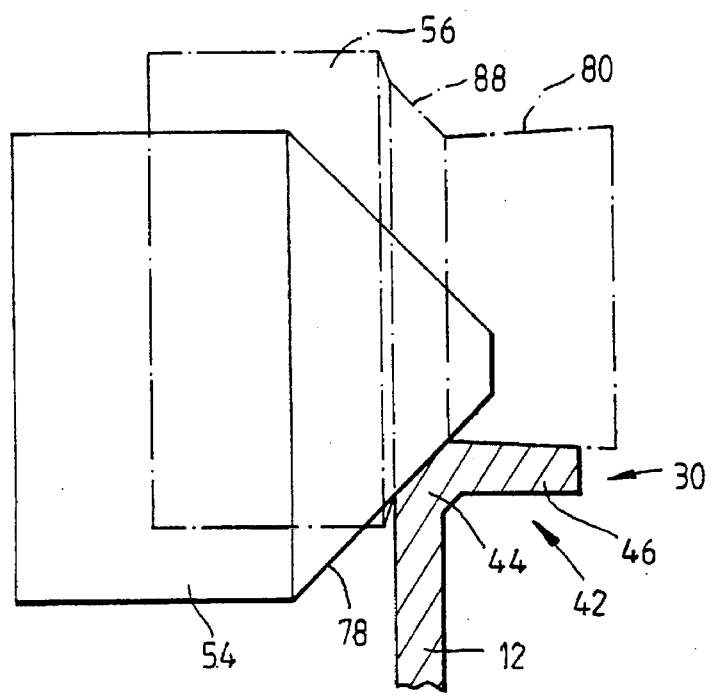

The apparatus 50 is used to spin close the end 30 of the suspension strut 10 as follows. The end 30 of the suspension strut 10, after insertion of the various internal components, is inserted into the throughbore 52 in the direction B relative to the apparatus 50 and spun about its axis L. Any suitable arrangement for spinning the suspension strut 10 which is known to those skilled in the art can be used and will not be described in detail. Initially, the end 30 makes contact with the surfaces 78 of the rollers 54. As the suspension strut 10 continues to move in the direction B, the section 42 of the outer tube 12 is bent over at an angle of approximately 45° by the contact surface 78 as shown in FIG. 4. Further movement of the suspension strut 10 in the direction B brings the free end of the section 42 into contact with the surface 80 of the rollers 56. Still further movement of the suspension strut 10 in the direction B results in the section 42 of the outer tube 12 pushing the rollers 54 back into their bore 60 against the bias of spring 68, and the contact surface 80 on the rollers 56 forming the second portion 46 of the section 42 as shown in FIG. 5. The suspension strut 10 is then removed from the throughbore 52 in the opposite direction to B.

In practice, the contact surface 80 on the rollers 56 is at an angle slightly greater than 90° to allow for the resilience of the second portion 46 of the section 42, which will tend to spring back outwards slightly after spin closing. The contact surface 80 preferably has an extension 88 at the opposite end to its free end which is at an angle of approximately 45° to the axis A which contacts, and retains the integrity of, the first portion 44 of the section 42.

The strength of the spring 68 is predetermined to prevent the rollers 54 retracting too early. The dimension H is predetermined to provide the required dimensions for the first and second portions 44,46 of the section 42.

Although the above embodiment discloses angles of 45° and 90° for the contact surfaces 78,80 respectively, it will be appreciated that other angles could be used dependent on the required arrangement of the suspension strut. The only requirement is that the angle of the contact surface on rollers 54 must be smaller than the angle of the contact surface on rollers 56 relative to the axis A.

What is claimed is:

1. Apparatus for spin closing an open end of a tube of a suspension strut comprising: a throughbore having a longitudinal axis; a first pair of rollers, each roller of the first pair being rotatably mounted within in a bore of a housing communicating with the throughbore, each roller having a contact surface at a first predetermined angle to the longitudinal axis and extending into the throughbore, each roller being biased toward said longitudinal axis by a spring such that the contact surface can retract from the throughbore against the biasing action of the spring as the tube is inserted within the throughbore and contacts said contact surface; and a second pair of rollers, each roller of the second pair being rotatably mounted within a bore opening into the throughbore, and having a contact surface at a second predetermined angle to the longitudinal axis and extending into the throughbore; wherein the second predetermined angle is greater than the first predetermined angle; and wherein the first pair of rollers is offset from the second pair of rollers along the longitudinal axis such that, on insertion, the open end of the tube of the suspension strut will make contact with the contact surfaces of the first pair of rollers before contacting the contact surfaces of the second pair of rollers.

2. Apparatus as claimed in claim 1, wherein the first predetermined angle is substantially 45°.

3. Apparatus as claimed claim 2, wherein the rollers of the first pair of rollers are positioned substantially diametrically opposite one another relative to the throughbore, and wherein the rollers of the second pair of rollers are positioned substantially diametrically opposite one another relative to the throughbore, and substantially at 90° to the first pair of rollers.

4. Apparatus as claimed in claim 1 or claim 2, wherein the second predetermined angle is substantially 90°.

5. Apparatus as claimed claim 4, wherein the rollers of the first pair of rollers are positioned substantially diametrically opposite one another relative to the throughbore, and wherein the rollers of the second pair of rollers are positioned substantially diametrically opposite one another relative to the throughbore, and substantially at 90° to the first pair of rollers.

6. Apparatus as claimed claim 1, wherein the rollers of the first pair of rollers are positioned substantially diametrically opposite one another relative to the throughbore, and wherein the rollers of the second pair of rollers are positioned substantially diametrically opposite one another relative to the throughbore, and substantially at 90° to the first pair of rollers.

7. Apparatus as claimed in claim 1 wherein when the tube is inserted within the throughbore the tube initially contacts the first pair of rollers wherein the open end is bent over at an angle and upon further movement of the tube into the throughbore the tube pushes the first pair of rollers into the bores in the housing wherein the open end of the tube contacts both the first pair of rollers and the second pair of rollers simultaneously to spin closed the open end.

* * * * *